US010970498B2

(12) United States Patent
Arjomandi

(10) Patent No.: US 10,970,498 B2
(45) Date of Patent: Apr. 6, 2021

(54) CHIPLESS RFID DECODING SYSTEM AND METHOD

(71) Applicant: Palo Alto Research Center Incorporated, Palo Alto, CA (US)

(72) Inventor: Larry Arjomandi, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/394,220

(22) Filed: Apr. 25, 2019

(65) Prior Publication Data

US 2020/0342187 A1 Oct. 29, 2020

(51) Int. Cl.
*G06K 7/10* (2006.01)
*H01Q 1/22* (2006.01)
*H04B 5/00* (2006.01)

(52) U.S. Cl.
CPC ..... *G06K 7/10356* (2013.01); *G06K 7/10366* (2013.01); *H01Q 1/2216* (2013.01); *H04B 5/0062* (2013.01); *H04Q 2209/47* (2013.01)

(58) Field of Classification Search
CPC .. G06K 7/10356; G06K 7/10366; G06K 7/10; H01Q 1/2216; H04Q 2209/47; H04B 5/0062; G01S 13/74; G01S 13/90; G06N 3/02; G06N 99/00; G06F 17/30
USPC ................................. 340/13.26, 10.1–10.5
See application file for complete search history.

(56) References Cited

U.S. PATENT DOCUMENTS

| | | | |
|---|---|---|---|
| 6,558,444 B1 | 5/2003 | Hunter | |
| 7,030,761 B2* | 4/2006 | Bridgelall | G01S 5/14 340/538.11 |
| 7,119,738 B2* | 10/2006 | Bridgelall | G01S 13/32 342/129 |
| 7,574,732 B2* | 8/2009 | Knox | H04L 63/0492 726/3 |
| 8,537,014 B2* | 9/2013 | Broer | G01S 13/74 235/375 |
| 9,213,873 B2* | 12/2015 | Austin | G06K 7/10108 |
| 9,904,824 B2* | 2/2018 | Karmakar | G01S 3/08 |
| 2010/0328073 A1* | 12/2010 | Nikitin | G01S 5/12 340/572.1 |
| 2017/0116444 A1 | 4/2017 | Karmakar et al. | |
| 2018/0121689 A1 | 5/2018 | Tehranipoor et al. | |
| 2018/0300513 A1 | 10/2018 | Afzali-Ardakani et al. | |
| 2019/0138806 A1* | 5/2019 | Banerjee | G06K 9/0051 |
| 2019/0296979 A1* | 9/2019 | Gupta | H04L 67/00 |

FOREIGN PATENT DOCUMENTS

| | | |
|---|---|---|
| WO | 2013/082665 | 6/2013 |
| WO | 2018218313 | 12/2018 |

OTHER PUBLICATIONS

European Search Report dated Sep. 24, 2020 from EP Application No. 20169223.3, 8 pages.

* cited by examiner

*Primary Examiner* — Nam V Nguyen
(74) *Attorney, Agent, or Firm* — Mueting Raasch Group

(57) ABSTRACT

An approach for training a system to decode a chipless RFID tag involves varying at least one reading parameter of an interrogation signal and acquiring a test response signal response to each variation of the interrogation signal. One or more simulated response signals are simulated for one or more variations of the reading parameter. A decoding processor is trained to decode the identification (ID) of the RFID tag using the test response signals and the simulated response signals.

19 Claims, 19 Drawing Sheets

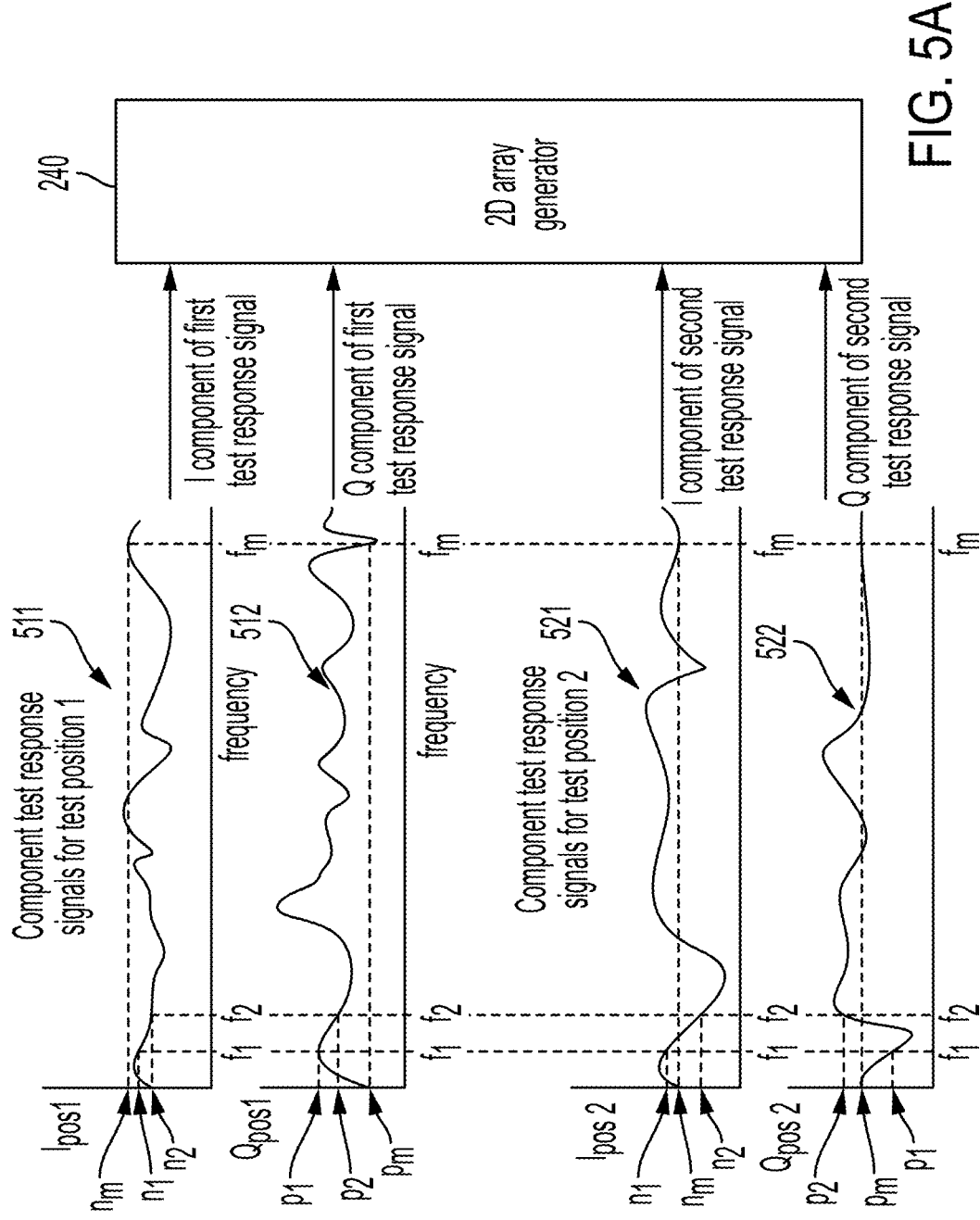

US 10,970,498 B2

CHIPLESS RFID DECODING SYSTEM AND METHOD

BACKGROUND

The radio frequency identification (RFID) tag is a type of identification device. When interrogated by a reading device which is also called an interrogator, RFID tags reflect or retransmit a radio frequency signal to return an encoded identification (ID) to the interrogator. RFID tag devices may be of two basic types. Chipped RFID tags include a microchip that stores data. Chipless RFID tags do not contain a microchip but instead rely on magnetic materials or transistorless thin film circuits to store data. As a general rule, chipped RFID tags cost more but have a larger data capacity than chipless RFID tags.

BRIEF SUMMARY

Some embodiments involve a method of decoding a chipless RFID tag. An interrogation signal is transmitted from one or more test positions relative to the RFID tag and one or more test response signals are received from the RFID tag. The test response signals are respectively responsive to the interrogation signal transmitted from the one or more test positions. One or more simulated response signals that correspond to one or more simulated positions of the interrogation signal are simulated. A decoding processor is trained to decode an identification (ID) of the RFID tag using the test response signals and the simulated response signals.

Some embodiments are directed to a chipless RFID interrogation system. A transmitter is configured to transmit an interrogation signal from one or more test positions relative to the RFID tag. A receiver receives one or more test response signals from the RFID tag which are respectively responsive to the interrogation signal transmitted from the one or more positions. A data augmentation processor simulates one or more simulated response signals corresponding to one or more simulated positions of the interrogation signal. A decoding processor is trained to decode an identification (ID) of the RFID tag using the test response signals and the simulated response signals.

According to some embodiments, a method of decoding a chipless RFID tag involves varying at least one reading parameter of an interrogation signal. A test response signal is received in response to each variation of the interrogation signal. One or more simulated response signals are simulated for one or more variations of the reading parameter. A decoding processor is trained to decode the identification (ID) of the RFID tag using the test response signals and the simulated response signals.

BRIEF DESCRIPTION OF DRAWINGS

FIG. 5A shows the I and Q components of the first and second training signals in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

A frequency-based chipless RFID tag can be interrogated by transmitting a radio frequency signal from an interrogator (also referred to as a reader) to the RFID tag. The chipless RFID tag scatters back (reflects) the interrogation signal and the identification (ID) data of the RFID tag are encoded within the backscattered signal. Many RFID tags in use are made on microwave substrates that are expensive and not flexible enough to be used as labels in production lines. Another problem with frequency-based chipless RFID tags is that their response may change, both in amplitude and resonant frequency, with variation in reading parameters. The reading parameters may comprise various factors that affect reading the RFID tag, such as strength of the interrogation signal, distance between the RFID tag and the reader, relative translational position of the RFID tag and the reader, and reading angle which comprises the angle of the interrogation wave towards the RFID tag and/or the angle of the reflected backscattered response wave towards reader. The reading angle may encompass one or more rotational angles in three dimensions.

Figure 1A:
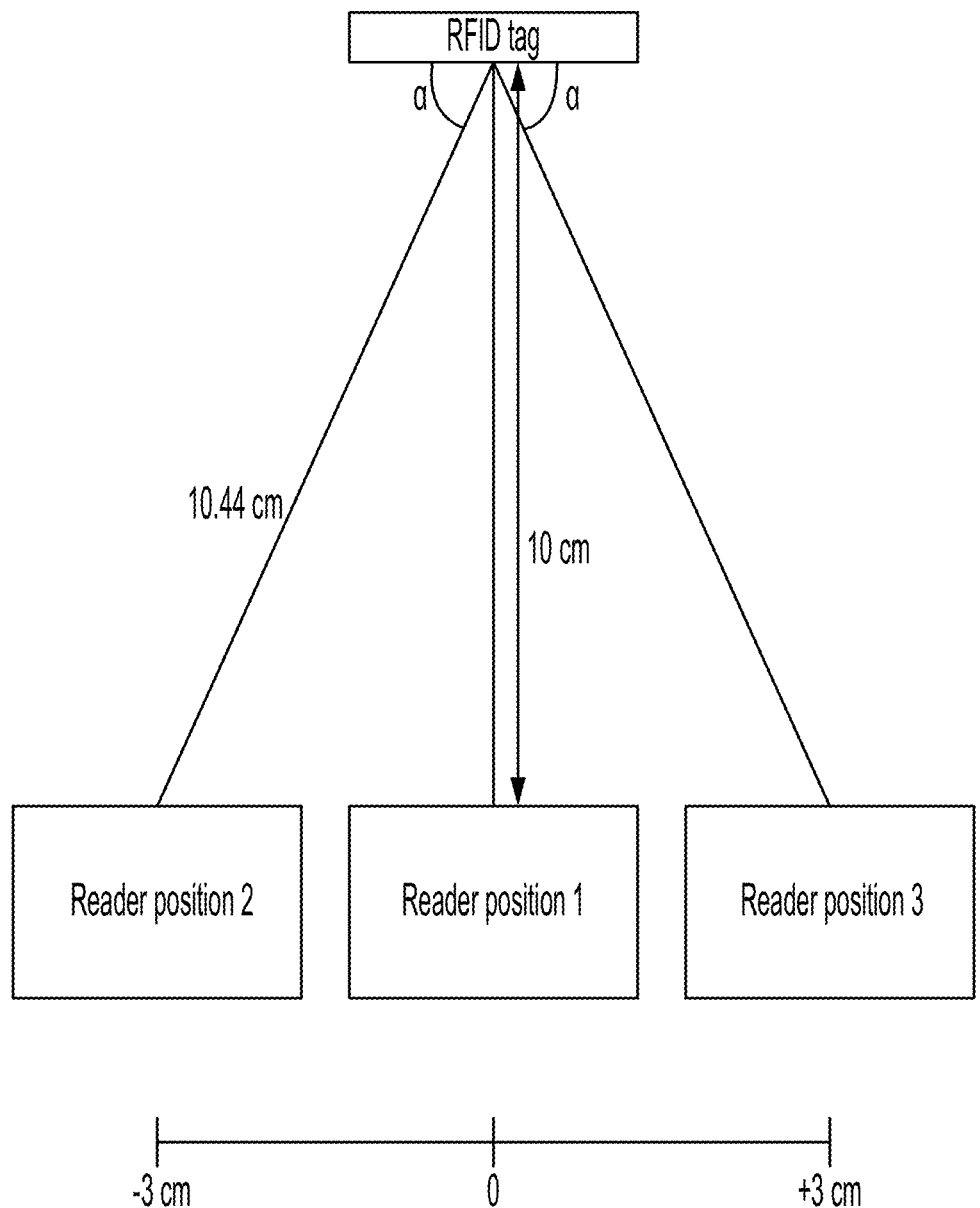
FIG. 1A shows three relative positions of an RFID tag and an interrogator—directly in front of the midpoint of the antenna transmitting the interrogation signal at a distance of 10 cm, offset from the midpoint to the left by 3 cm, and offset to the right from the midpoint 3 CM.

FIG. 1A shows an RFID tag and reader at relative positions 1, 2, and 3. At position 1, the interrogation and backscatter waves are perpendicular to the surface of the RFID tag and the reference point of the RFID tag is 10 cm from the reference point on the reader (which may be the midpoint of the transmitting or receiving antenna array of the reader, for example). At position 2, the reader is shifted by 3 cm to the left (designated as—3 cm). At position 3, the reader is shifted by 3 cm to the right (designated as +3 cm). At positions 2 and 3, the interrogation wave and backscatter wave make an angle α with respect to the surface of the RFID tag.

Figure 1B:
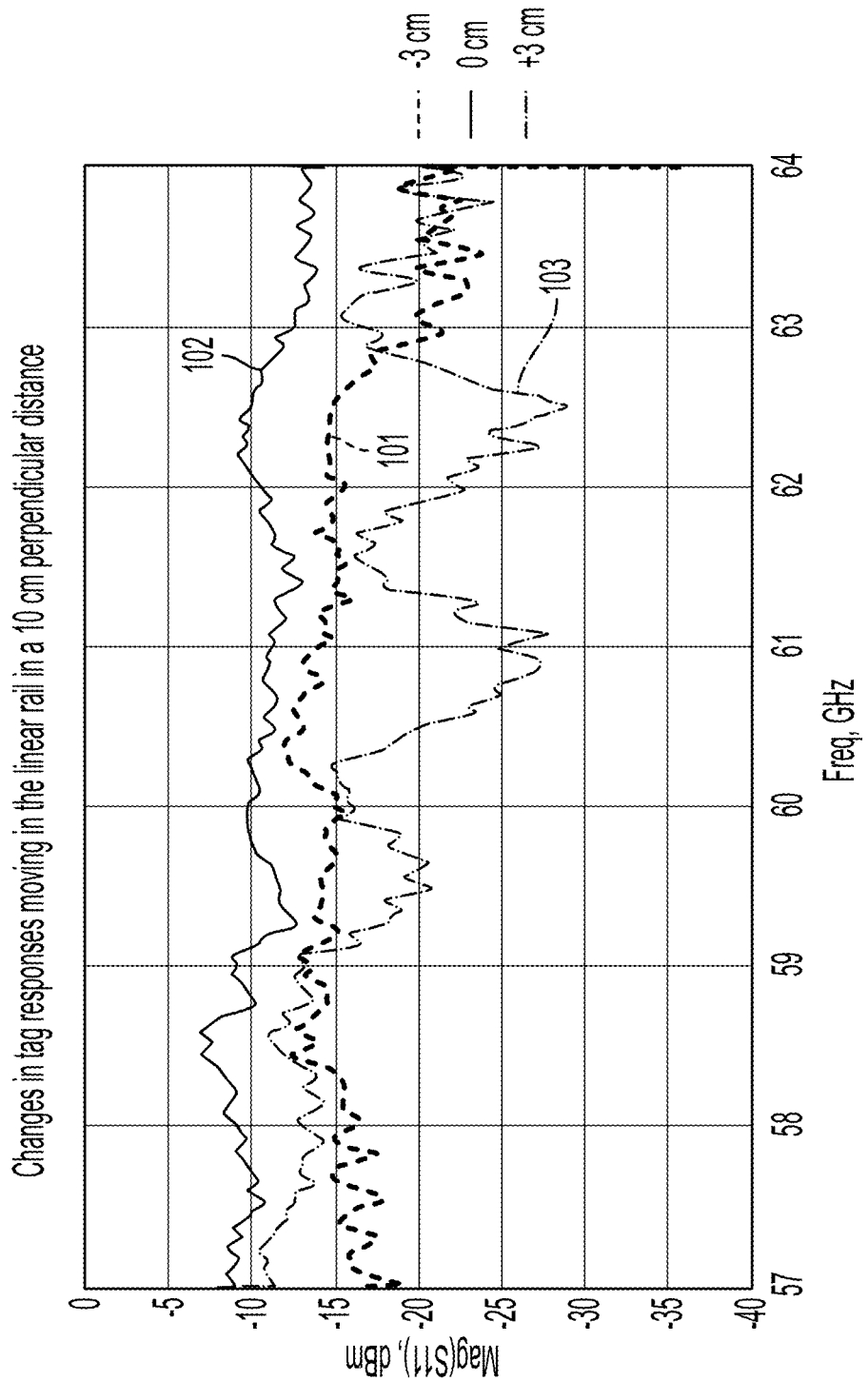
FIG. 1B shows plots of signals backscattered (reflected) from the RFID tag of FIG. 1A from the three different positions.

FIG. 1B shows overlaid plots of the backscattered RFID signals when the reader is disposed at the three different positions relative to the RFID tag. FIG. 1B shows the signal backscattered from an RFID tag when the interrogator is located directly in front of the RFID tag and at a distance of 10 cm (position 1, graph 101); offset to the left by 3 cm (position 2, graph 102); and offset to the right by 3 cm (position 3, graph 103). The transmitting antenna for this experiment was a monostatic horn having a gain of 13 dBi and transmitted power of −5 dBm. From observation of FIG. 1B, the difficulty in accurately decoding the data from an RFID tag backscattered signal when the RFID tag is located at different positions relative to the reader can be appreciated.

Embodiments disclosed herein are directed to systems and methods that enhance accuracy of decoding the signal from an RFID tag to obtain the tag ID when reading parameters vary. The disclosed approaches are particularly useful when the RFID tag is deposited on less expensive, flexible substrates, such as by ink printing on plastic substrates.

The approaches disclosed herein involve training a decoding processor that may comprise, for example, a deep learning network, to decode RFID tags from backscattered RFID response signals that are emitted in response to the interrogator signals. The decoding processor is trained using one or more measured test response signals and/or one or more simulated response signals. The test response signals are obtained by interrogating the RFID tag and measuring the backscattered response signals from the RFID tag. Several test response signals may be obtained for several different interrogation signals in which at least one reading parameter is varied. The simulated response signals are obtained by simulating the response of the RFID tag in which variation of the reading parameter is simulated. In the examples provided below, the reading parameter that varies is relative position of the RFID tag and reader. Thus, for the examples provided, several test responses are obtained for several different relative positions of the RFID tag and reader and simulated responses are generated for simulated relative positions of the RFID tag and reader. Although illustrated for variation in position, the approach may be implemented for any reading parameter that can exhibit variation from reading-to-reading of the RFID tag.

The simulated response signals may be estimated by any suitable function estimator. In some embodiments, the simulated response signals are estimated by a shallow learning network. Each response signal (test or simulated) may comprise several components. For example in some implementations, the components of the response signal are a magnitude signal with respect to frequency and a phase signal with respect to frequency. In some implementations the components of the response signal are an In-phase (I) signal with respect to frequency and a Quadrature (Q) signal with respect to frequency. The characteristic components of the test or simulated response signal that are used in the disclosed approaches may be frequency, phase, polarization, amplitude, I, Q, or other any other characteristics of the scattered signal, or any combination of these. Furthermore, the characteristic components are not limited to a pair of components as used in the examples herein but can be any number of components.

According to some embodiments, data from the test response signals and the simulated response signals are converted into multi-dimensional arrays, e.g., two dimensional (2D) image arrays. In these embodiments, the multi-dimensional arrays are used to train a deep learning network to decode the RFID tag ID.

As discussed above, according to some embodiments, the RFID decoding system includes a shallow learning network that generates simulated signals used to train a deep learning network to decode RFID tags. Shallow learning networks typically have one hidden layer, whereas deep learning networks use multiple hidden layers and pooling techniques. Shallow learners mainly depend on the modelling of features predictions, but deep learners can potentially extract better representations from the data which results in higher accuracy models. More generally, the data augmentation processor may comprise any function estimator capable of simulating response signals for variations in one or more reading parameters, wherein a reading parameter may be a transmission parameter associated with transmission of the interrogation signal or a receive parameter associated with reception of the response signal from the RFID tag. When the data augmentation processor is a shallow learner, the shallow learning is trained to produce the simulated response signals. Both the data augmentation processor and the decoding processor may be trained using supervised learning in which the algorithm iteratively makes predictions on the training data and are corrected by a supervisor until the algorithm achieves an acceptable level of performance. According to some embodiments, the training dataset used to train the data augmentation processor is the set of measured test response signals. According to some embodiments provided as illustrative examples herein, the training data set used to train the decoding processor comprises groups of image arrays for each tag ID, however, the system can be trained on any array data without conversion to an image array.

Figure 2:
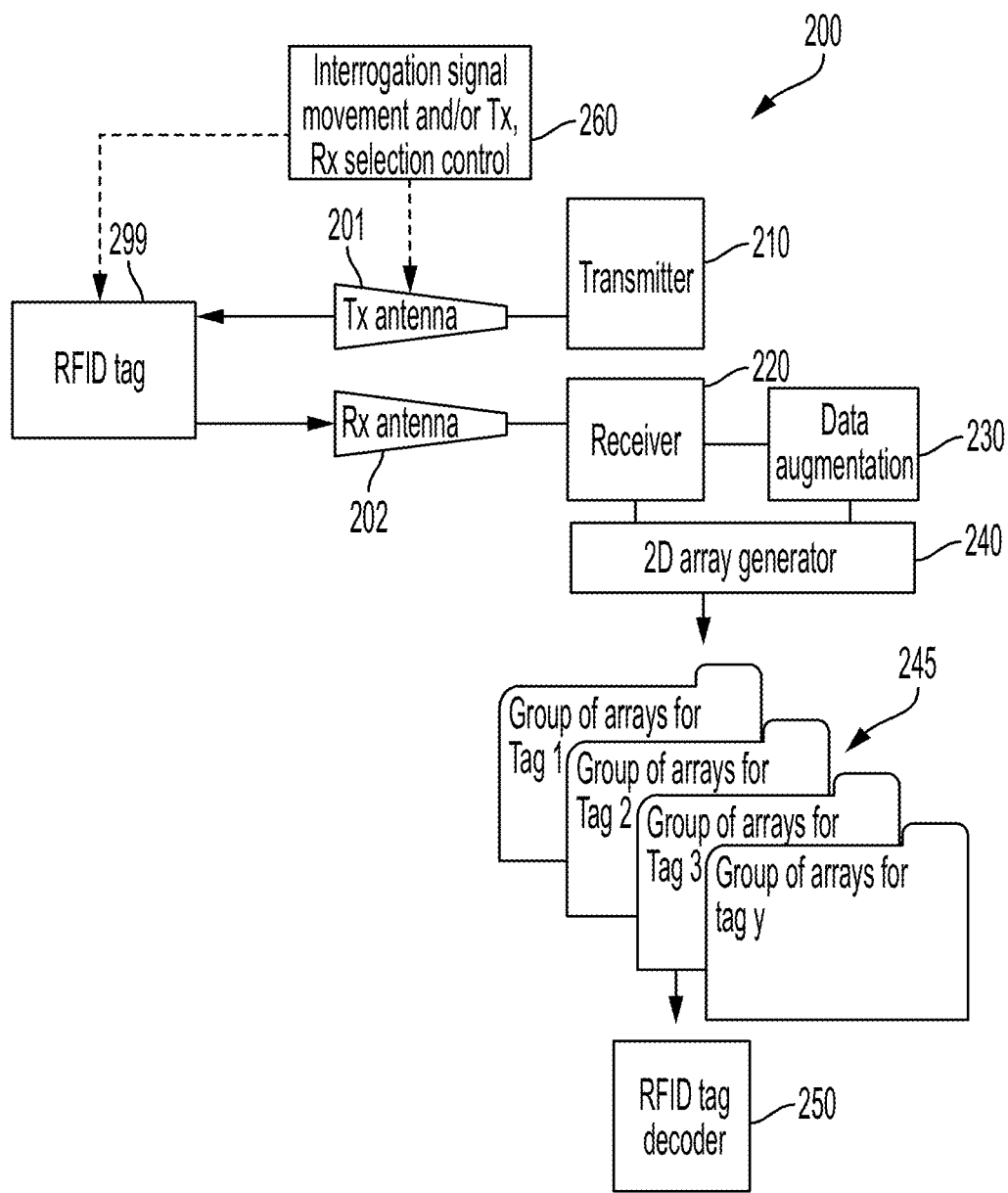
FIG. 2 is a block diagram that conceptually illustrates components of a system that implements the RFID tag ID decoding approach in accordance with some embodiments.
Figure 13:
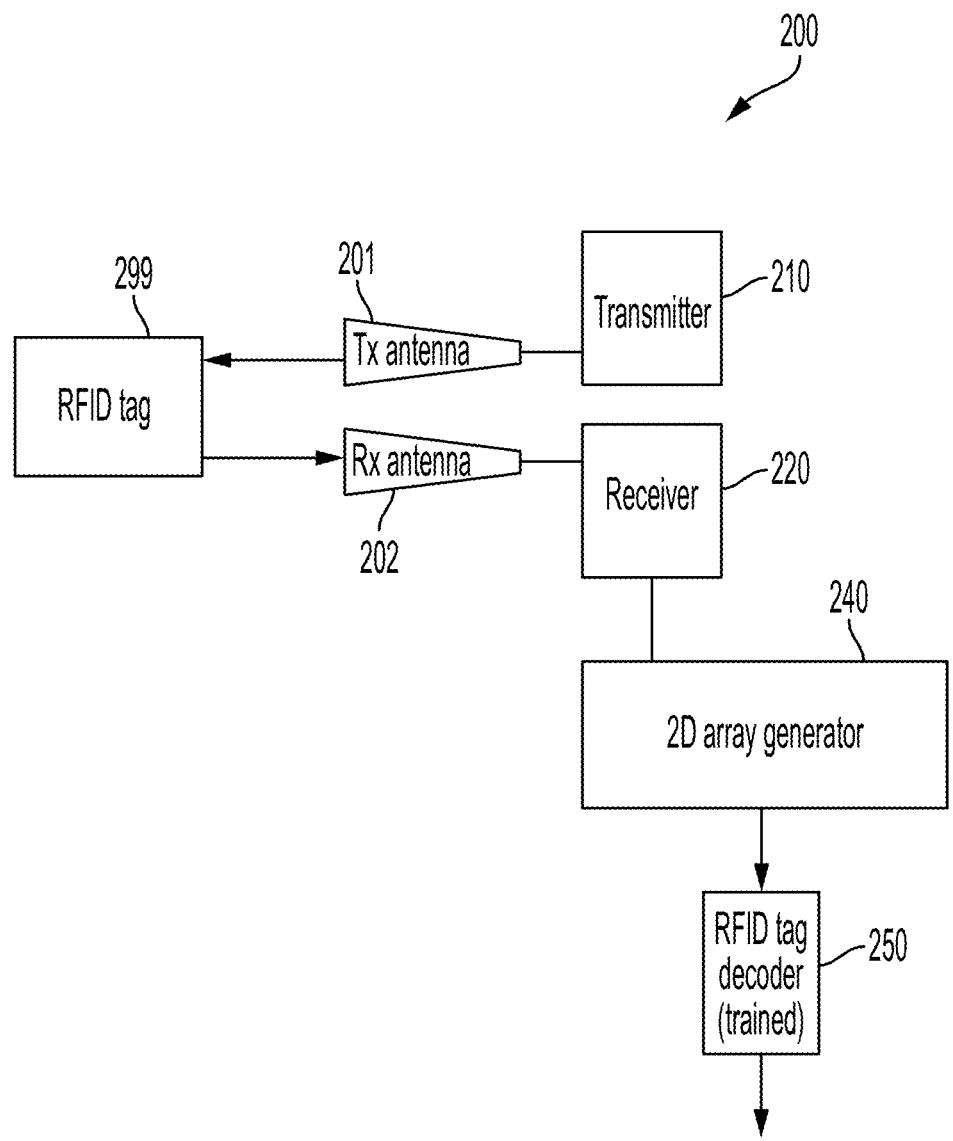
FIG. 13 is a block diagram illustrating the system of FIG. 2 during the RFID Tag decoding phase that occurs after the decoding processor is trained in accordance with some embodiments.

FIG. 2 is a conceptual block diagram illustrating components of an RFID reader system 200 in accordance with some embodiments. Note that not all components are in use in all system states. FIGS. 3A through 3D illustrate how components illustrated in FIG. 2 are used to train a decoding processor. FIG. 13 illustrates how components illustrated in FIG. 2 are used to decode RFID tags after training is complete.

Figure 3A:
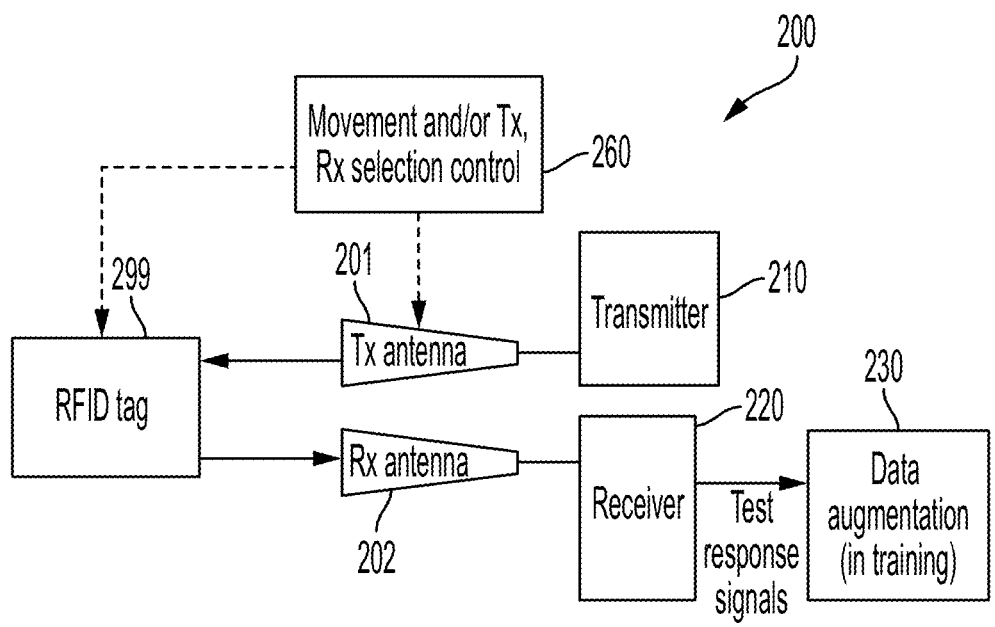
FIG. 3A shows components of the system of FIG. 2 during collection of test response signals that are used to train the data augmentation processor in accordance with some embodiments.

FIG. 3A shows components of the system 200 during collection of test response signals that are used to train the data augmentation processor 230. During collection of the test response signals, transmitter electronics 210 transmits interrogation signals to the RFID tag via the transmit antenna 201. The interrogation signal may be a continuous wave (CW) signal that sweeps through a frequency band, e.g., a band of 57 to 64 GHz. In some embodiments, the interrogation signal may be a frequency modulated continuous wave (FMCW) instead.

A receiver antenna 202 receives the backscattered signal from the RFID tag 299 responsive to the interrogation signal. The receiver electronics 220 processes the received signal and provides component signals such as I and Q signals or magnitude and phase signals as discussed in more detail herein. The antennas 201, 202 may comprise any type of suitable antennas, such as a monostatic horn antenna, a bistatic antenna, or an array of antennas arranged in a multiple-input-multiple-output (MIMO) antenna configuration, for example.

As previously discussed, a test response signal may be collected for several variations of a reading parameter. By way of example, the position of the reader 200 relative to the RFID tag 299 is the reading parameter that is varied in the embodiment of FIGS. 2-3D. The system 200 includes a controller 260 that controls the relative movement of the RFID tag and reader and/or controls the Tx,Rx antenna selection. According to some embodiments, the movement controller 260 provides for relative movement between the RFID tag 299 and the reader system 200 to one or more test positions. For example, in various embodiments, the controller 260 may cause the RFID tag 299 to move relative to the reader 200, or the controller 260 may cause the reader 200 to move relative to the RFID tag 200, or the controller 260 may cause both the reader 200 and the RFID tag 299 to move relative to one another.

As another example, in some embodiments the Tx and Rx antennas 201, 202 may comprise multiple antennas arranged in a multiple-input-multiple-output (MIMO) antenna array. In this scenario, controller 260 may select different Tx antennas to use for transmitting the interrogation signal and/or may select different Rx antennas to use for receiving the backscattered response signal from the RFID tag 299. Selecting different Tx and/or Rx from an MIMO array of Tx and Rx antennas effectively changes the relative position between the reader 200 and the RFID tag.

Some embodiments involve both physical movement of the RFID tag 299 and/or the reader 200 in addition to selection of the Tx and/or Rx antennas in a MIMO array. In such scenarios, selecting the Tx and/or Rx antennas from a MIMO array may lead to reduction in the number of physical movements or reduction in the range of physical movement of the RFID tag 299 and/or reader 200 needed to collect the test response signals.

Figure 3B:
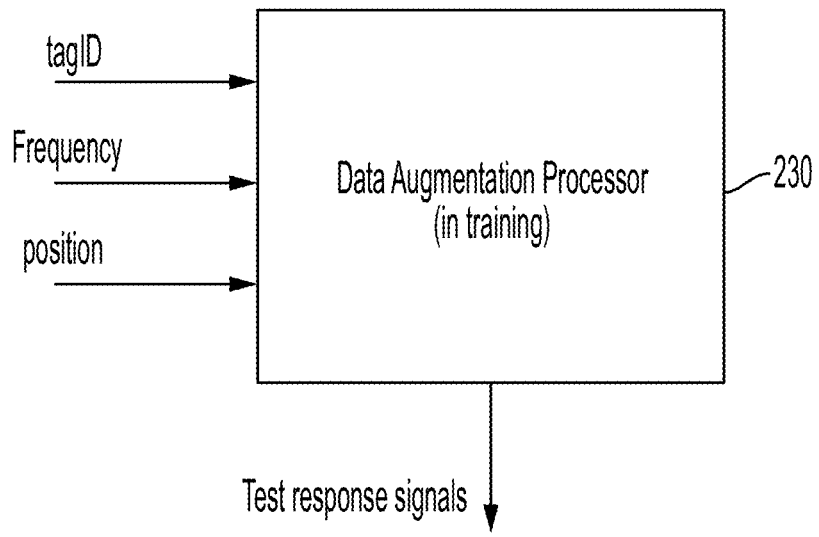
FIG. 3B is a block diagram showing the data augmentation processor in training in accordance with some embodiments.

FIG. 3B illustrates a data augmentation processor 230 that is in training. During the training phase of the data augmentation processor 230, the measured test response signals are used to train the data augmentation processor 230 to generate additional simulated response signals for additional simulated relative positions of the RFID tag 299 and reader 200. As illustrated in FIG. 3B, the data augmentation processor is trained to output the components of a test response signal, e.g., I and Q or magnitude and phase, when given the tag ID, frequency, and position of the test response signal. After the training process illustrated in FIGS. 3A and 3B, the data augmentation processor 260 has been trained to output simulated response signals for simulated positions of the RFID tag 299 and reader 200.

Figure 3C:
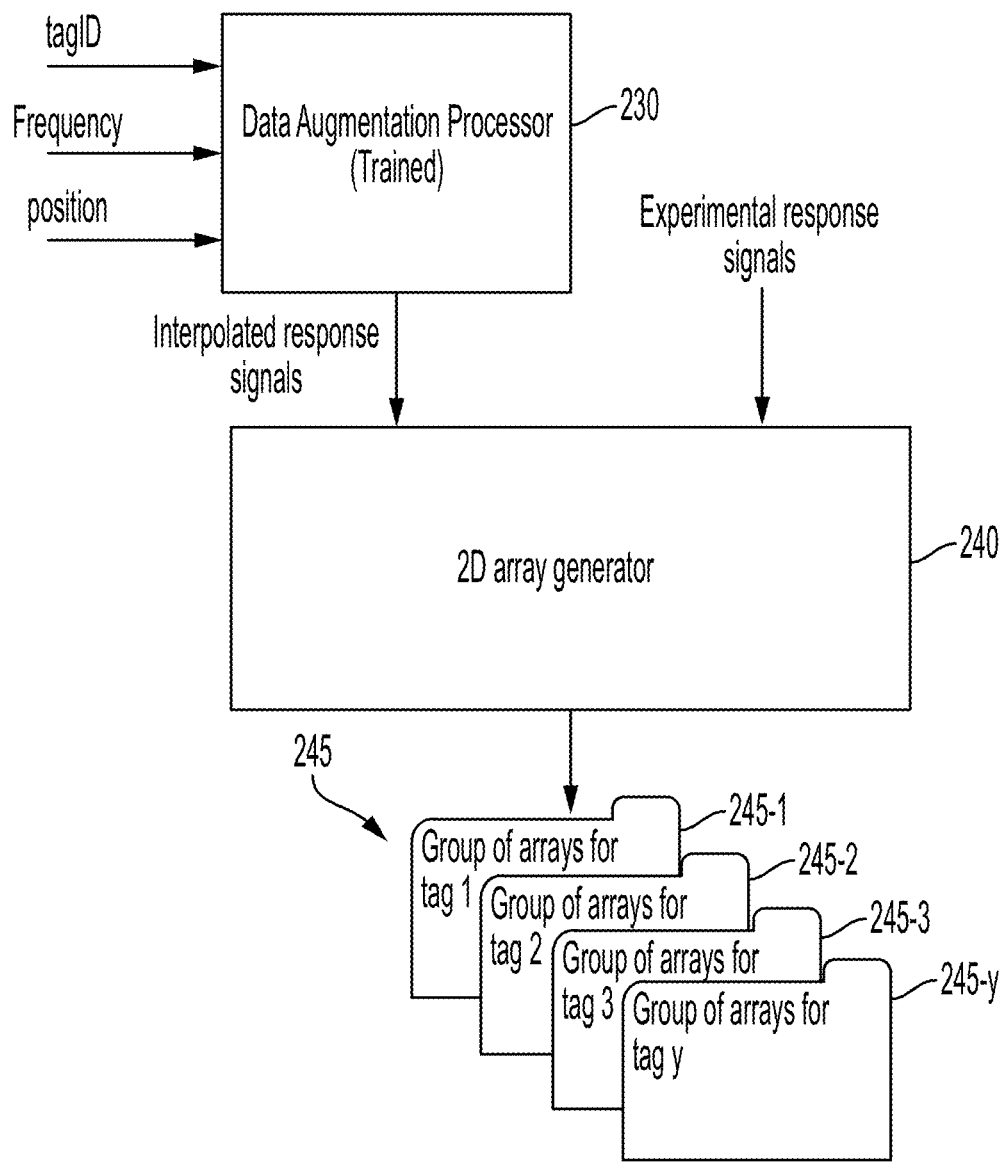
FIG. 3C illustrates formation of the training arrays that are used to train the decoding processor in accordance with some embodiments.

FIG. 3C illustrates formation of the training data that are used to train the decoding processor 250, which may be implemented as a deep network learner. The trained data augmentation processor 260 outputs simulated response signals when given a tag ID, frequency, and simulated position. Both the test response signals and the simulated response signals generated by the data augmentation processor 260 are input to an array generator 240. As previously discussed, each test response signal and each simulated response signal may comprise two components. For example in some implementations, the components of the test response signals and simulated response signals are a magnitude signal and a phase signal with respect to frequency. In some implementations the components of the test response signals and simulated response signals are an In-phase (I) signal and a Quadrature (Q) signal with respect to frequency. The array generator 240 arranges the data point values of the component signals (magnitude and phase or I and Q) of the test response signals and simulated response signals into a multi-dimensional array. The array generator 240 may also convert each multi-dimensional array into an image format, such as portable graphics network (png) format, a tagged image file format (tiff) or another suitable image format. Groups 245 of image arrays formed from the values of the test response signals and the simulated response signals are used to train a decoding processor 250 to decode ID of the RFID tags 299. FIG. 3C shows four groups 245-1, 245-2, 245-3, 245-y of arrays corresponding to RFID tags 1, 2, 3, and y. Each group 245-1, 245-2, 245-3, 245-y comprises image arrays formed from test response signals and image arrays formed from simulated response signals for a particular RFID tag.

Figure 3D:
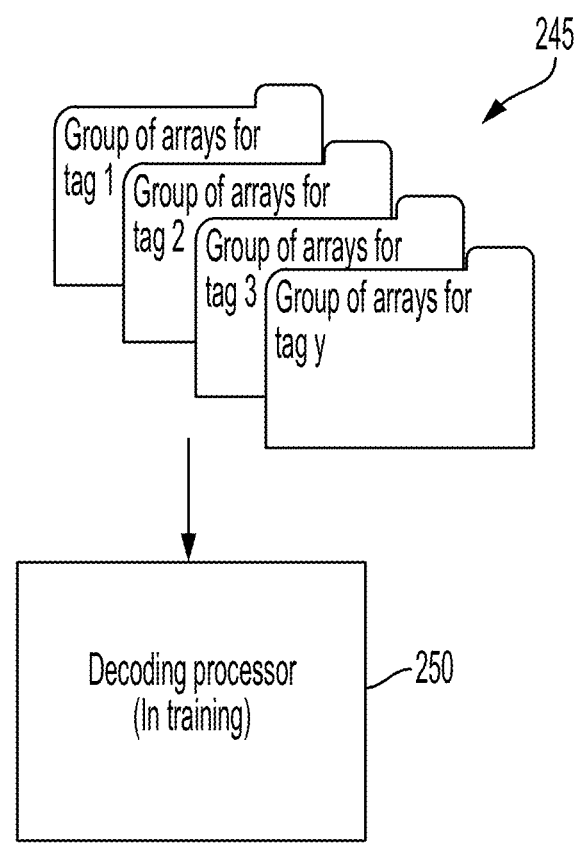
FIG. 3D is a block diagram showing the configuration of the system of FIG. 2 during the decoding processor training phase in accordance with some embodiments.

FIG. 3D is a block diagram showing the configuration of the system 200 during the decoding processor training phase. The groups of arrays 245 comprising image arrays formed from both test response signals and simulated response signals are used to train the decoding processor 250 to decode the ID from RFID tags.

Figure 4:
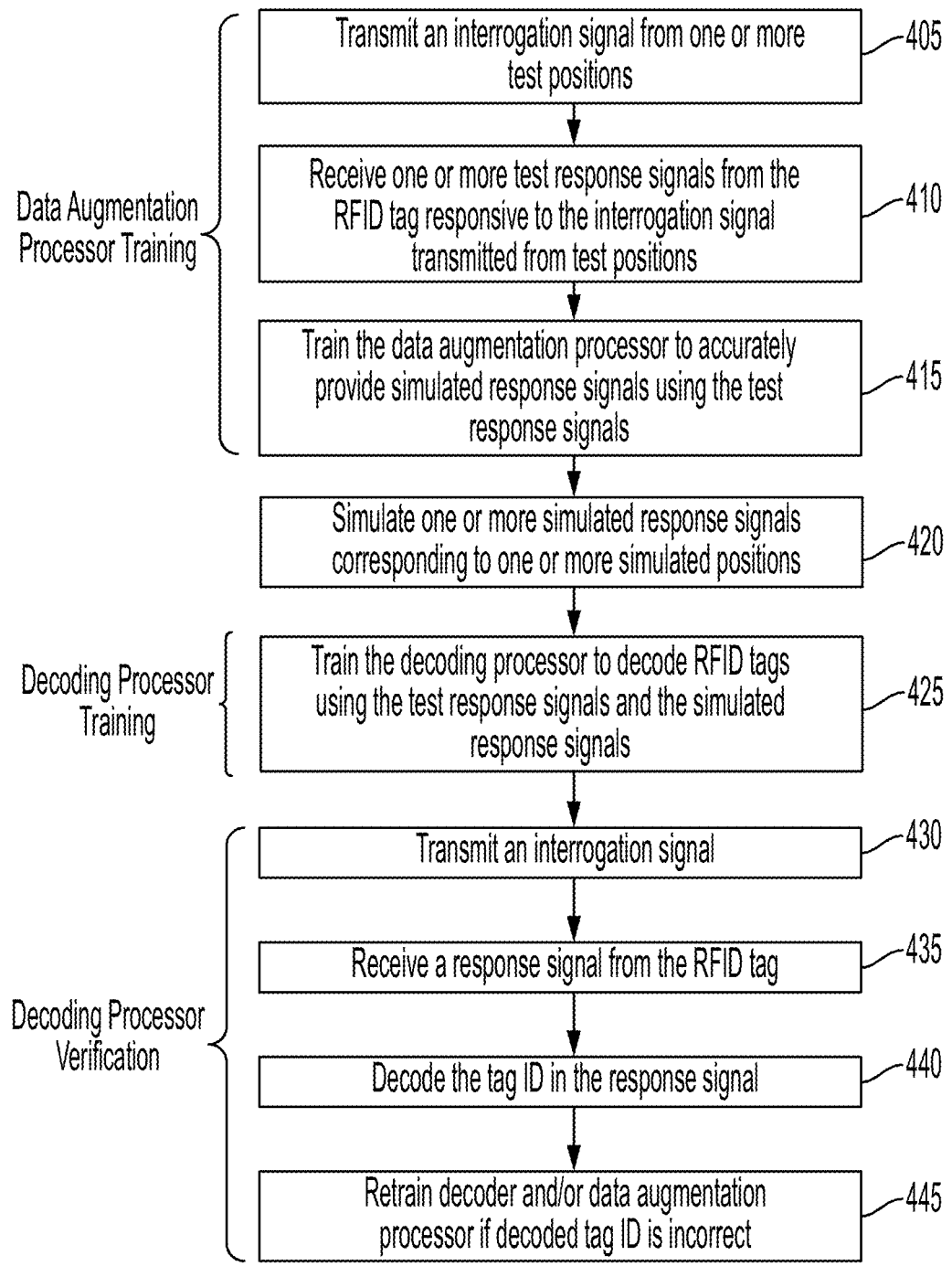
FIG. 4 is a flow diagram illustrating the training and re-training phases for the data augmentation processor and/or the decoding processor in accordance with some embodiments.

FIG. 4 is a flow diagram illustrating operation of the system 200 during the training phase when the reading parameter that is varied is position of the RFID tag. During the data augmentation training phase (blocks 405 through 415 of the flow diagram of FIG. 4), test response signals are acquired by transmitting 405 an interrogation signal from one or more test positions and receiving 410 the test responses that are backscattered from the RFID tag for each test position. The test signals acquired are used to train 415 the data augmentation processor to provide simulated response signal data.

The deep learning decoding processor needs a large amount of data for training and verification. The number of test response signals obtained is limited because measuring the test response signals from many different positions of the interrogation signal can be a time consuming process. The data augmentation processor, once properly trained, can quickly produce 420 a large quantity of simulated response signals from many simulated positions. The data augmentation processor can simulate response signals to a positional resolution of about 1 mm, for example. The simulated response signals from the augmented data processor and the test response signals can be used for training the deep learning network in the next phase of training. As previously discussed, the test response signals and the simulated response signals can be converted to 2D image arrays that are used to train the decoding processor.

During the decoding processor training phase (block 425 of the flow diagram of FIG. 4), the decoding processor is trained to decode RFID tag IDs. The decoding processor, e.g., a deep learner, is trained 425 using the test response signals and the simulated response signals. As discussed herein, the test and simulated response signals may be converted to 2D arrays in image formats before they are used to train the decoding processor.

A verification phase (blocks 430 through 445 of the flow diagram of FIG. 4 may be implemented after the decoding processor training phase. The reader transmits a verification interrogation signal and receives a backscattered verification response signal from the RFID tag. The decoding processor decodes the tag ID present in the verification response signal. A supervisor determines if the tag ID is correct or incorrect. If incorrect, retraining occurs. Retraining can involve using the verification response signal to re-train the decoding processor. Alternatively or additionally, retraining can involve using the verification response signal to retrain the data augmentation processor to produce additional simulated response signals. The decoder is then retrained using the additional simulated response signals and/or the verification response signal.

Figure 5B:
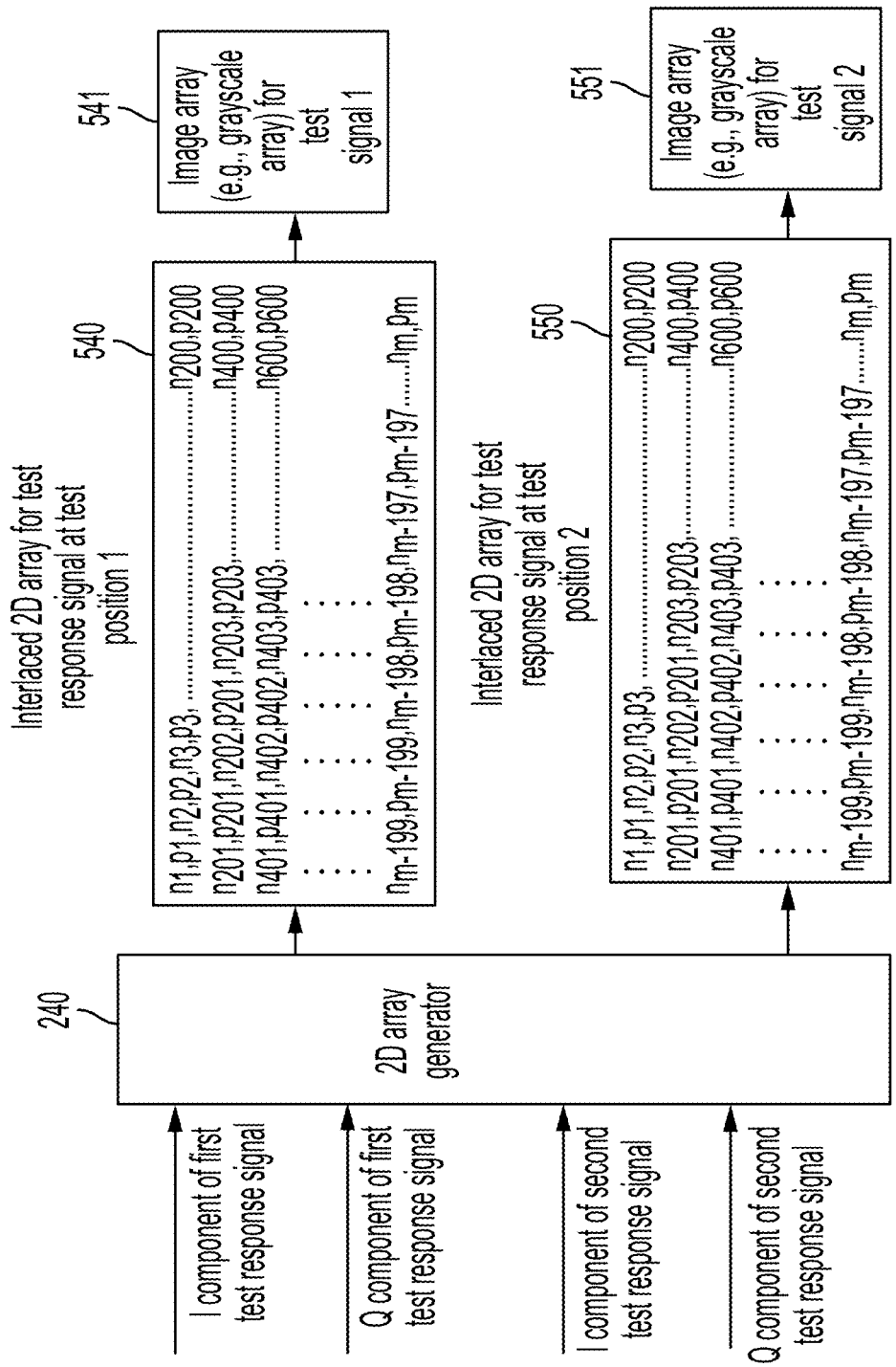
FIG. 5B shows arrays created from I and Q signal components of training signals in accordance with some embodiments.
Figure 6:
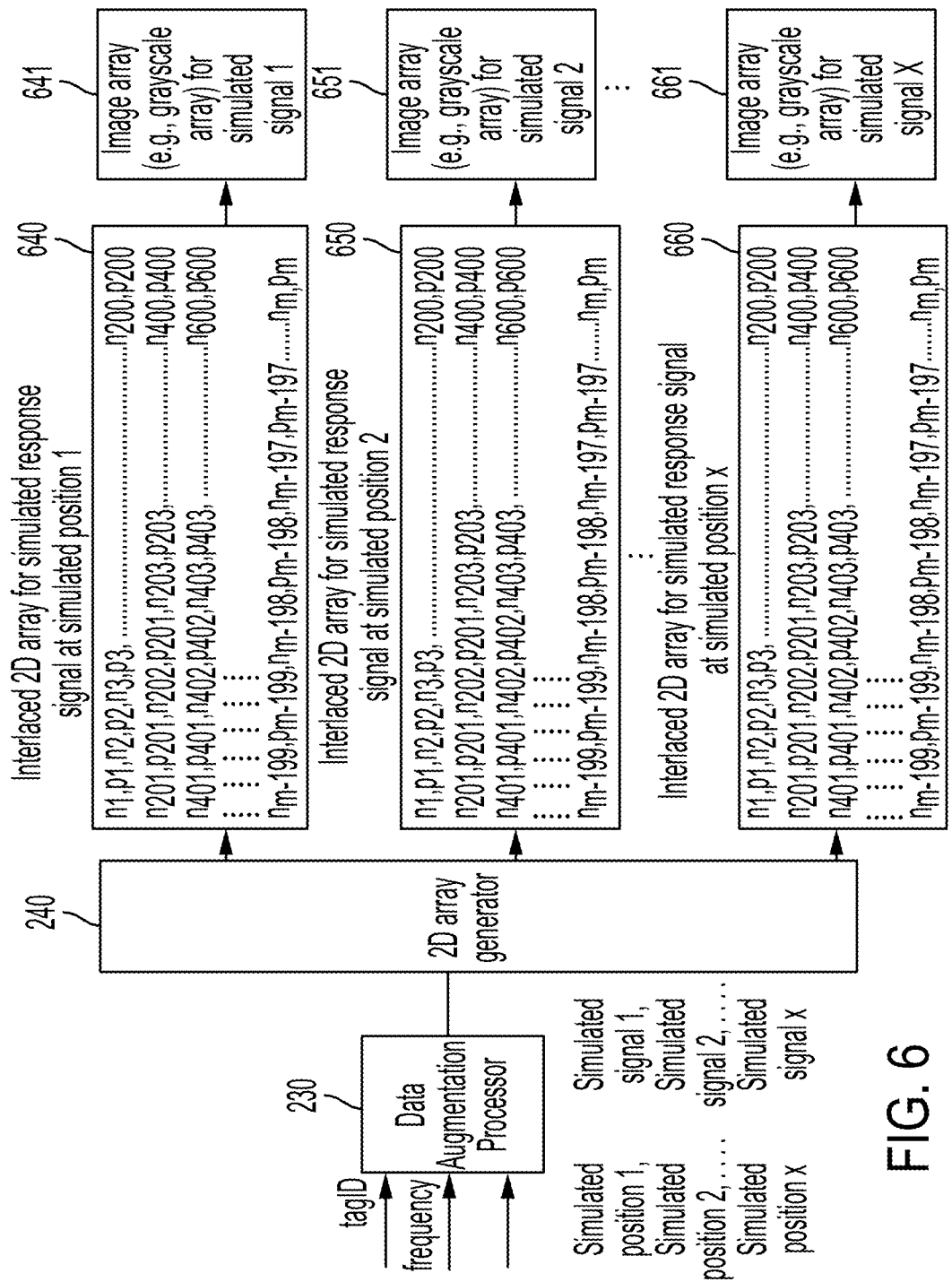
FIG. 6 shows arrays created from I and Q signal components of simulated signals in accordance with some embodiments.

Prior to training the decoding processor, the test response signals and the simulated response signals may be provided to an array generator (240 of FIG. 2) that arranges the values of each of the test and simulated response signal into a multi-dimensional array. The decoding processor is trained using the arrays created for the test response signals and the simulated response signals. FIGS. 5A, 5B, and 6 illustrate creation of arrays from the test and response signals. This example presumes that two test signals are acquired and x simulated signals are generated and there are m data points in each signal.

FIG. 5A conceptually shows the I and Q components of the first and second test signals. In FIG. 5A, graph 511 is the I vs. frequency component of the first test response signal responsive to the interrogation signal transmitted from the first test position; graph 512 is the Q vs. frequency component of the first test response signal responsive to the interrogation signal transmitted from the first test position; graph 521 is the I vs. frequency component of the second test response signal responsive to the interrogation signal transmitted from the second test position; and graph 522 is the Q vs. frequency component of the second test response signal responsive to the interrogation signal transmitted from the second test position.

Graph 511 shows three data point values $n_1$, $n_2$, $n_m$ of the I component of the first test response signal taken at three frequencies $f_1$, $f_2$, $f_m$, respectively (other data point values are also obtained but are not shown). Graph 512 shows three data point values $p_1$, $p_2$, $p_m$ of the Q component of the first test response signal taken at three frequencies $f_1$, $f_2$, $f_m$, respectively (other data point values are also obtained but are not shown). Similarly, graph 521 shows three data point values $n_1$, $n_2$, $n_m$ of the I component of the second test response signal taken at three frequencies $f_1$, $f_2$, $f_m$, respectively (other data point values are also obtained but are not shown). Graph 522 shows three data point values $p_1$, $p_2$, $p_m$ of the Q component of the second test response signal taken at three frequencies $f_1$, $f_2$, $f_m$, respectively (other data point values are also obtained but are not shown). It will be appreciated that the graphs 511, 521 include many data point values $n_1$, $n_2$, and the graphs 512, 522 include many data points $p_1$, $p_2$, ... $p_m$ taken respectively at frequencies $f_1$, $f_2$, ... $f_m$ that may be obtained.

In FIG. 6, the data augmentation processor 230 simulates I and Q components for x simulated signals corresponding respectively to x simulated positions of the interrogation signal.

As illustrated in FIGS. 5B and 6, the I and Q signal components of the test response signals and the simulated response signals are input to the array generator 240 which organizes the data point values $n_1$, $n_2$, ... and $p_1$, $p_2$, ... for the I and Q components of each response signal into a two dimensional array 540, 550, 640, 650, 660. FIG. 5B shows array 540 created from I and Q signal components 511 and 512 and array 550 created from I and Q signal components 521 and 522. FIG. 6 shows array 640 created from I and Q signal components of the first simulated signal, array 650 created from I and Q signal components of the second simulated signal, and array 660 created from I and Q signal components of the $x^{th}$ simulated signal. To create the arrays, the I and Q component values may be normalized, e.g., to a 0 to 255 scale. In some scenarios, the data points of the I and Q component signal may be interlaced such that the I values ($n_1$, $n_2$, $n_3$, ... $n_m$) and the Q values ($p_1$, $p_2$, $p_3$, ... $p_m$) alternate in the array ($n_1$, $p_1$, $n_2$, $p_2$, $n_3$, $p_3$ ... $n_m$, $p_m$) as shown in FIGS. 5B and 6. In some implementations, the number of data points, m, for each I or Q component signal may equal about 40,000 and the arrays 540, 550, 640, 650, 660 may be arranged as 200×200 arrays.

As illustrated in FIGS. 5B and 6, the array generator may transform the arrays 540, 550, 640, 650, 660 to image arrays 541, 551, 641, 651, 661, wherein the image arrays may be grayscale or RGB arrays, for example. The image arrays may be in any graphic file format, such png format or tiff format and/or may have the size of a quick response (QR) code. Transformation of the I and Q component arrays 540, 550, 640, 650, 660 to image arrays 541, 551, 641, 651, 661 facilitates the use of an image recognizing deep learner as the decoding processor.

Figure 7:
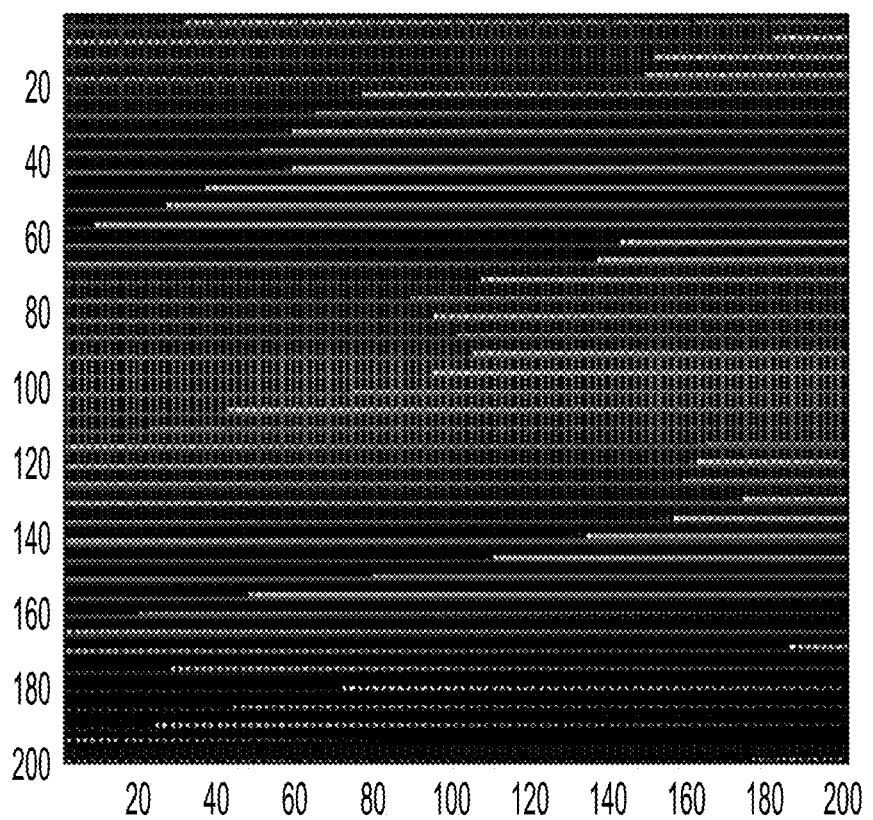
FIG. 7 shows an example of the image generated from a 200×200 grayscale array in accordance with some embodiments.

FIG. 7 shows an example of the image generated from a 200×200 grayscale array. An image arrays may be created for each of several test and simulated positions for each of the RFID tags with a position resolution of 1 mm, for example. The image arrays are used in the next portion of the training phase to train the decoding processor's deep learner network. Deep learners typically need many images and powerful machines with GPUs to train. The training process may be streamlined by choosing an already trained image recognizing deep network, such as GoogleNet or AlexNet, modifying the deep network's initial layer to accommodate the data obtained, and adapting the last stages of the output layer to be compatible with the desired outcome for RFID tag decoding.

As an example, every pre-trained network has its own structure for inputs and outputs. The input for GoogleNet and AlexNet is true color images, with the size of 224*224*3 pixels. The arrays produced by the array generator may be 200*200*3, so the first layer of the pre-trained deep learner network may be adjusted to match the input image format of the arrays produced by the 2D array generator in accordance with disclosed embodiments.

Figure 8:
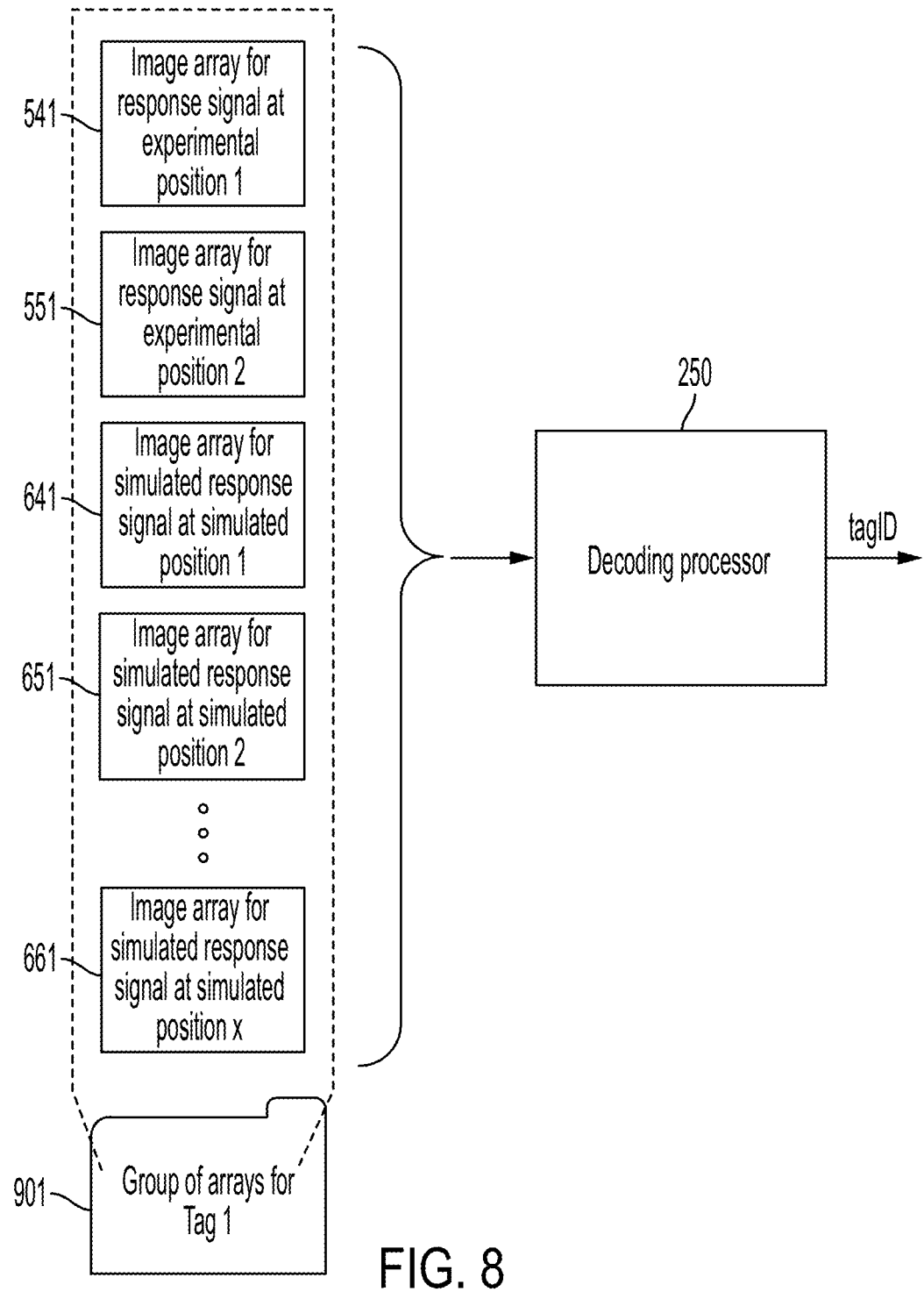
FIG. 8 illustrates a group of arrays that characterize the response of a particular tag, Tag 1, at x different positions in accordance with some embodiments.
Figure 9:
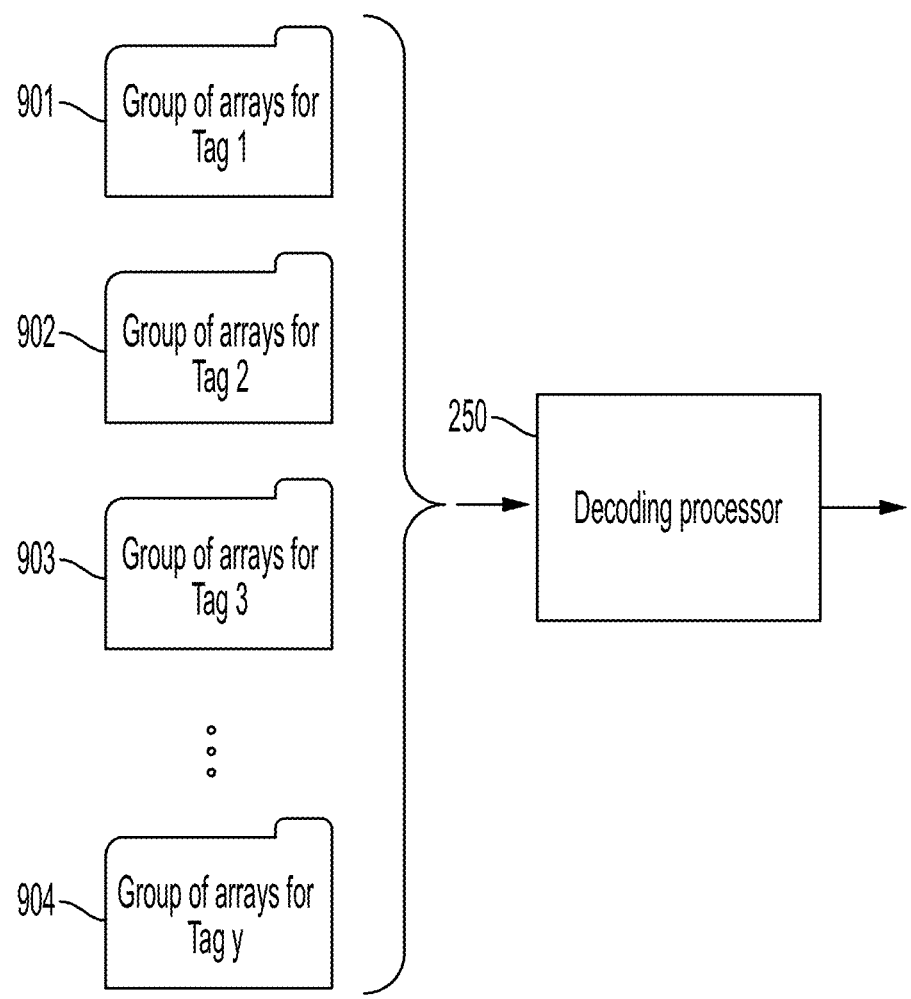
FIG. 9 illustrates groups of arrays that characterize the responses of Tag 1, Tag 2, to Tag y that are used for training the decoding processor in accordance with some embodiments.

FIG. 8 illustrates the group 901 of image arrays 541, 551, 641, 651, 661 that characterize the response of a particular tag, Tag 1, at x different positions. This group 901 of arrays 541, 551, 641, 651, 661 are used to train the decoding processor 250 to decode the ID for Tag 1. FIG. 9 illustrates groups 901, 902, 903, to 904 of arrays that characterize the responses of Tag 1, Tag 2, to Tag y. Each group 901, 902, 903, to 904 includes arrays for the associated tag at x different test and simulated positions. The groups 901, 902, 903, to 904 of arrays are used to train the decoding processor 250 to decode the IDs for Tag 1, Tag 2, . . . to Tag y.

Figure 10:
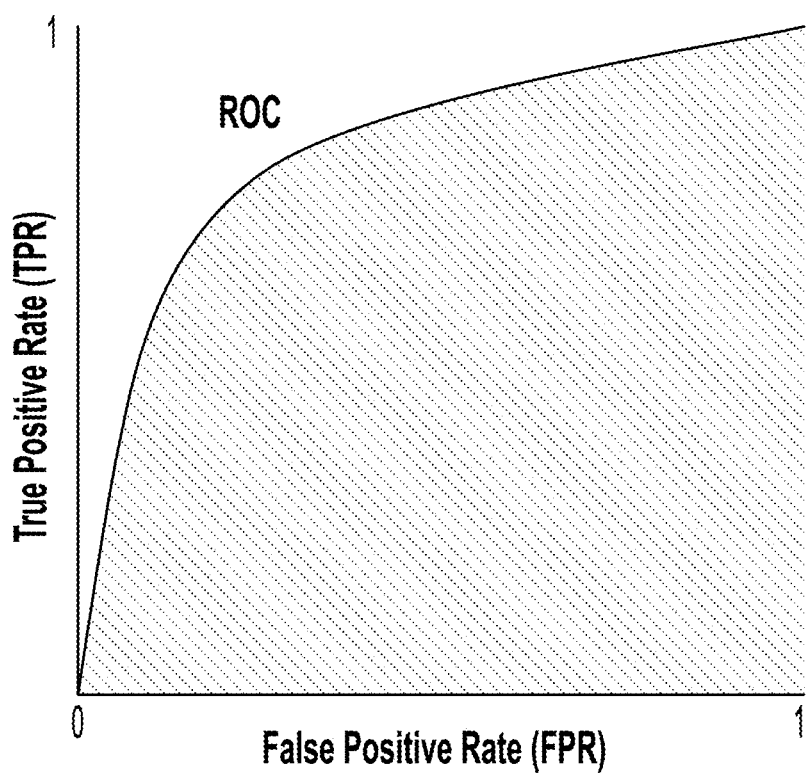
FIG. 10 illustrates a Region Under Convergence (ROC) curve.

There are many techniques for selecting and optimizing the algorithm for machine learning, and these are known to those skilled in the art. Larger training sets normally provide models which better generalize new data. The parameters that should be considered for choosing the best results are speed of training, memory usage, accuracy of prediction, and interpretability (or how easily the reason behind algorithm is understandable). One approach is a supervised training method that involves comparing the results of all available classifications, getting the initial results, and fine tuning the ones with good accuracy/Area Under Curve (AUC). Data accuracy here is defined as the percentage of correct matches in the verification data. Those data used for verification are not used in training. For example, about 70 percent of the training data may be used for training and about 20 percent of the unbiased data may be used for verification/validation and about 10 percent for testing. Area Under Curve refers to accuracy measured by the area under the Region of Convergence (ROC) curve. The ROC curve is plotted with true positive rate (TPR) against the false positive rate (FPR) where TPR is on y-axis and FPR is on the x-axis as illustrated in FIG. 10, where $$TPR = \frac{TP}{TP+FN} \text{ and } FPR = \frac{FP}{FP+TN}$$

Figure 11:
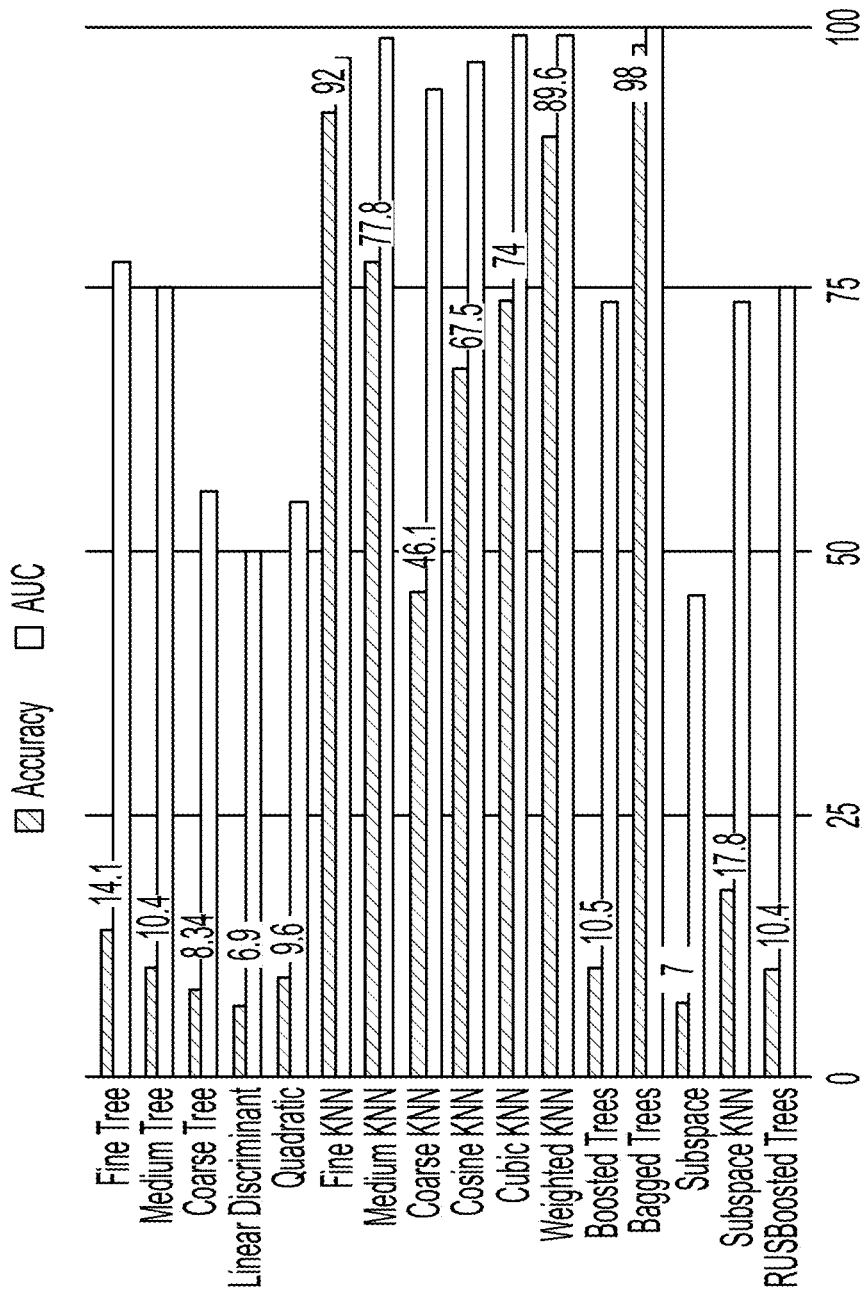
FIG. 11 is a graph that shows the accuracy and typical Area Under Curve (AUC) for an RFID tag sample set of 81 for some decoder algorithms tested.

A number of algorithms were tested for RFID tag decoding including Fine Tree, Medium Tree, Coarse Tree, Linear Discriminant, Quadratic, Fine K Nearest Neighbor (KNN), Medium KNN, Coarse KNN, Weighted KNN, Boosted Trees, Bagged Trees, Subspace, Subspace KNN, RUS-Boosted Trees, to name a few. FIG. 11 is a graph that shows the accuracy and typical AUC for an RFID tag sample set of 81 for some of the algorithms tested.

Considering accuracy and Area Under Curve (AUC), for this particular experiment, the best algorithms for RFID tag decoding were found to be fine Gaussian support vector machine (SVM), fine- and weighted-KNN, BaggedTrees, and SubspaceKNN Ensembles, or similar. A detection rate of 96 percent was reached with Subspace KNN.

Figure 12:
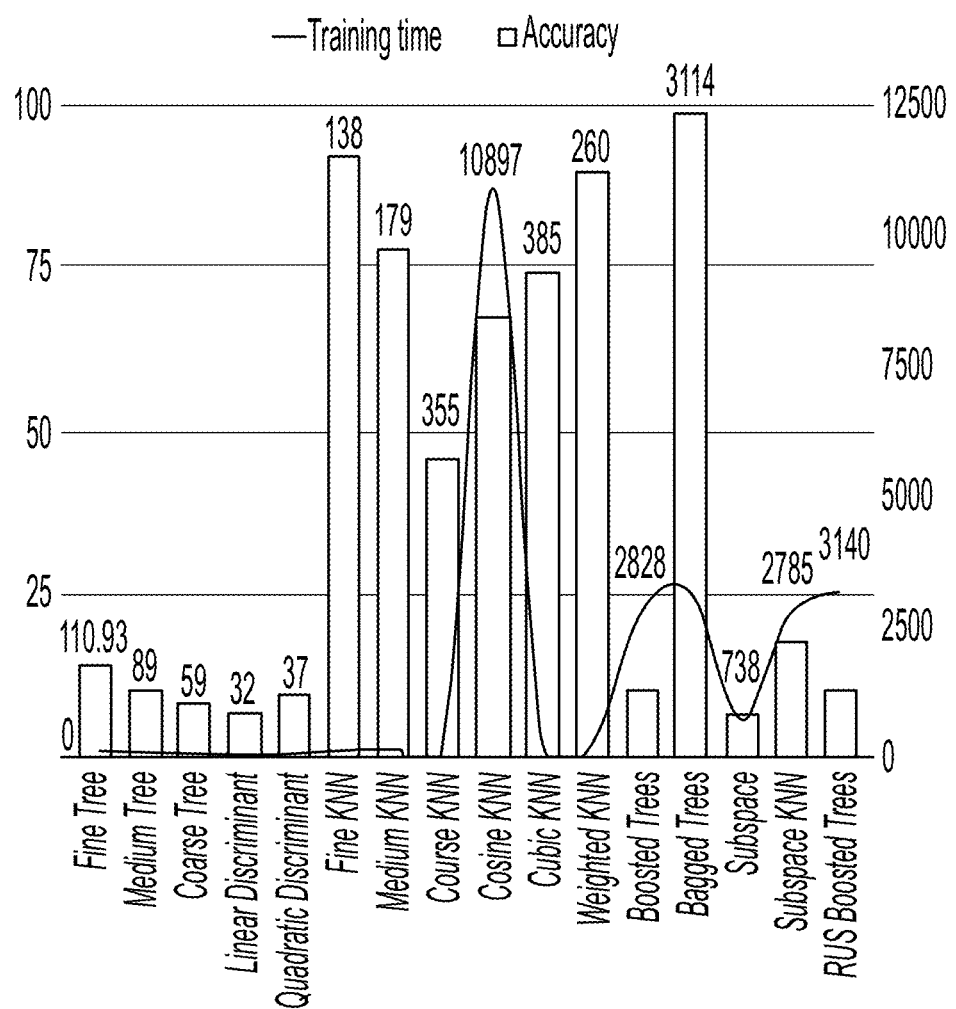
FIG. 12 shows overlaid accuracy and training time graphs for the algorithms depicted in FIG. 11.

FIG. 12 shows overlaid accuracy and training time graphs. Adding new tags to the system requires additional training of the network. Thus, algorithms that take a long time to train, such as Bagged Trees or Cosine KNN, are suboptimal if the flexibility of adding new tags is desired. Fine-KNN shows a very good compromise both in the training time and also in the accuracy and its performance is quite satisfactory for the disclosed applications.

Figure 14:
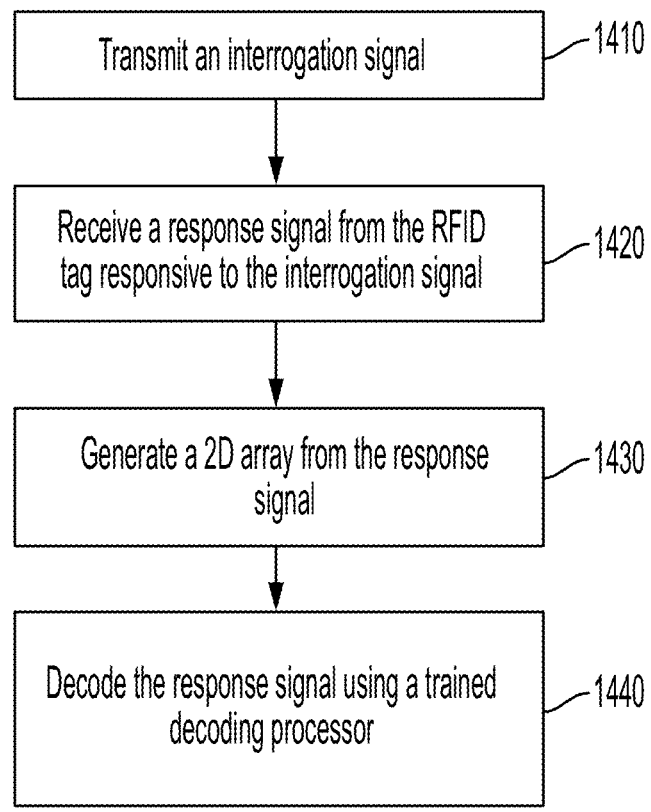
FIG. 14 is a flow diagram that illustrates the process of using a reader with a trained decoder to decode RFID tag IDs in accordance with some embodiments.

FIG. 13 is a block diagram illustrating the system 200 during the RFID Tag decoding phase that occurs after the decoding processor is trained. FIG. 14 is a corresponding flow diagram that illustrates the process of using a trained decoder to decode RFID tag IDs. The system 200 transmits 1410 an interrogation signal to the RFID tag and receives 1420 a response signal from the RFID tag 299. The response signal is provided to the array generator 240 which generates 1430 an array characterizing the response signal. As previously discussed, in some embodiments, the array may be a 2D image array such as a grayscale array. The array may comprise a 200×200 array of interlaced data points from the I and Q signal components as discussed herein. The array is input to the trained decoding processor 250 which recognizes 1440 the array as corresponding to a particular RFID tag ID. The decoding processor 250 provides the tag ID at its output.

Figure 15:
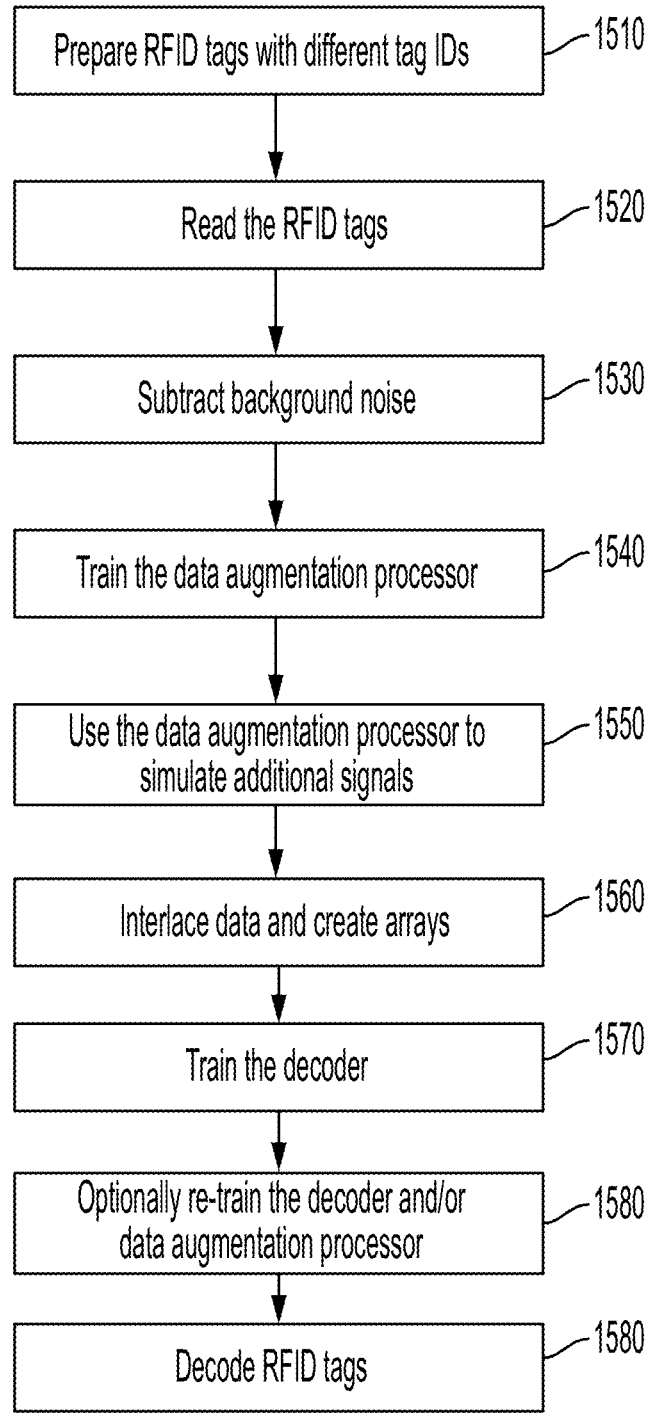
FIG. 15 is a flow diagram of a process for training a reader and decoding RFID tag IDs in accordance with some embodiments.

FIG. 15 is a flow diagram of a process for training a system and decoding RFID tag IDs in accordance with some embodiments. Different RFID tags are prepared 1510 to train the deep learning network of the decoding processor. It can be helpful if the same reader is used to read 1520 all the RFID tags. If there are different tag readers and/or tag movement controllers (e.g., movement on a linear rail or MIMO), these tag readers and/or movement controllers can be calibrated or unified to produce similar results.

As previously discussed, the interrogation signal may be a CW or FMCW signal that covers the frequency band of interest, e.g., 57-64 GHz. The I and Q (or magnitude and phase) components of background noise may be obtained by transmitting the interrogation signal and reading the backscattered noise signal in the absence of an RFID tag.

Test response signals from an RFID tag are obtained and the background noise is subtracted 1530 from the of I and Q (or magnitude and phase) components of the test response signals. The shallow network of the data augmentation processor can be trained 1540 by supervised learning in which the tag ID, frequency, and position are provided as inputs and scattered parameter values (e.g., values of the I and Q (or magnitude and phase)) components of a simulated response signal are provided as outputs. The algorithm used by the data augmentation processor can be selected by considering accuracy, training time, and area under coverage of the results.

The trained data augmentation processor can provide 1550 more data and cover the gap in data acquisition between test data. For example, the test data may provide a few centimeters of positional resolution. The simulated data can increase the positional resolution to about a millimeter. For any RFID tag, with the augmented data (simulated response signals), there may be I and Q signal components for many relative positions of the RFID tag and reader.

The data points of the I and Q component signals may be interlaced, and then arranged 1560 in a 2D array. The dimensions of the array depend on the resolution of frequency scanning. The data can be normalized, e.g., corresponding to a scale ranging from to 0 to 255, and then arranged in a grayscale image of any graphic file format, such as portable network graphic (png) or tagged image file format (tiff), for example. If color-images are needed for pre-trained deep learners, this image can also be replicated for R, G and B components by generating two extra copies of the grayscale file. These three files can be assigned as R, G and B components.

Training 1570 deep learning networks is time consuming, and the use of a pre-trained network may reduce training time. The first input layer of the pre-trained network may be customized, e.g., to adjust to the size and/or format of the images produced by the array generator. The last layer (normally a pattern recognizer) may be modified Already trained networks have some known input- and output-layers. Their layers may be adjusted to fit the embodiments disclosed herein. For example, the input of the deep learner may be modified to accept 200*200*3 images and the output may be modified to recognize the tag ID of RFID tags. As an example, inputs to the GoogleNet and AlexNet may be a 224*224*3 true color image of an apple, and output is "Apple". These deep learners can be modified to accept RGB files according to the formats of the disclosed embodiments and to output a tag ID.

After the deep learner network training is complete, RFID tags placed in different positions with respect to the source of the interrogation signal of an RFID tag interrogator may be correctly decoded. The system interrogates the RFID tags by transmitting an interrogating signal and receiving the RFID tag response signal. The data points of the I and Q components of the response signal are interlaced to make a QR-shaped grayscale image array. This array is presented to the deep learner network for decoding. If erroneously decoded, the decoding processor can be retrained with the erroneously decoded image file and true tag ID to correct this recognition mistake in the future.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A method of decoding a chipless radio frequency identification (RFID) tag comprising:
   transmitting an interrogation signal from one or more test positions relative to the RFID tag;
   receiving one or more test response signals from the RFID tag, the one or more test response signals respectively responsive to the interrogation signal transmitted from the one or more test positions;
   simulating one or more simulated response signals corresponding to one or more simulated positions of the interrogation signal; and
   training a decoding processor to decode an identification (ID) of the RFID tag using the test response signals and the simulated response signals;
   wherein simulating the one or more simulated response signals comprises:
      providing a data augmentation processor with an RFID tag identification, frequency of a simulated interrogation signal, and position of the simulated interrogation signal; and
      simulating data point values of the simulated response signal based on the RFID tag identification, frequency of the simulated interrogation signal, and one or both of position and angle of the simulated interrogation signal.

2. The method of claim 1, wherein transmitting the interrogation signal from the test positions comprises moving one or both of a reader that transmits the interrogation signal and the RFID tag.

3. The method of claim 2, wherein moving one or both of the reader and the RFID tag comprises one or more of:
   changing an angle of the reader relative to the RFID tag;
   changing a translational position of the reader relative to the RFID tag;
   changing a distance between the reader relative to the RFID tag; and
   changing one or both of a transmit antenna and a receive antenna of the reader.

4. The method of claim 1, further comprising:
   measuring a background noise signal; and
   subtracting the background noise signal from each of the test response signals.

5. The method of claim 1, further comprising training a data augmentation processor to simulate the simulated response signals.

6. The method of claim 5, wherein training the data augmentation processor comprises supervised training using the test response signals.

7. The method of claim 1, further comprising converting each test response signal and each simulated response signal into a two dimensional array, wherein training the decoding processor to decode the RFID tag ID comprises training the decoding processor to decode the RFID tag ID based on a group of two dimensional arrays corresponding to each test response signal and each simulated response signal.

8. The method of claim 1, wherein:
   the data augmentation processor implements a data estimation function; and
   the decoding processor implements a deep learning network.

9. The method of claim 8, wherein the data estimation function comprises a shallow learning network.

10. The method of claim 1, wherein the decoding processor implements a Gaussian Support Vector Machine classifier, a Bagged Trees classifier, a fine k-Nearest Neighbor classifier, a weighted k-Nearest Neighbor classifier, or a Subspace k-Nearest Neighbor classifier.

11. The method of claim 1, further comprising retraining the decoding processor if the decoding processor erroneously decodes the ID of an RFID tag.

12. A chipless radio frequency identification (RFID) interrogation system comprising:
   a transmitter configured to transmit an interrogation signal from one or more test positions relative to an RFID tag;
   a receiver configured to receive one or more test response signals from the RFID tag, the one or more test response signals respectively responsive to the interrogation signal transmitted from the one or more positions;
   a data augmentation processor configured to simulate one or more simulated response signals corresponding to one or more simulated positions of the interrogation signal; and
   a decoding processor trained to decode an identification (ID) of the RFID tag using the test response signals and the simulated response signals;
   wherein the data augmentation processor is configured to:
      receive an RFID tag identification, frequency of a simulated interrogation signal, and position of the simulated interrogation signal; and
      simulate data point values of the simulated response signal based on the RFID tag identification, frequency of the simulated interrogation signal, and one or both of position and angle of the simulated interrogation signal.

13. The system of claim 12, further comprising an array generator configured to generate an array representing each of the test response signals and the simulated response signals, wherein the decoding processor is trained to decode the RFID tag ID using arrays that represent the test response signals and simulated response signals.

14. The system of claim 13, further comprising a movement controller configured to control movement of one or both of a reader that transmits of the interrogation signal and the RFID tag.

15. The system of claim 14, wherein the movement controller is configured to:
    change an angle of the reader relative to the RFID tag;
    change a translational position of the reader relative to the RFID tag;
    change a distance between the source of the reader relative to the RFID tag; and/or
    change a source of the interrogation signal.

16. The system of claim 14, wherein the movement controller is configured to:
    selectively activate an antenna from which the interrogation signal is transmitted; and/or
    selectively activate a receiver at which the test response signal is received.

17. The system of claim 12, wherein:
    the data augmentation processor implements a function estimator; and
    the decoding processor implements a deep learning network.

18. The system of claim 17, wherein the function estimator comprises a shallow learning network.

19. The system of claim 12, wherein the decoding processor implements a grayscale and/or red, green and blue (RGB) image recognition deep learner.

* * * * *